United States Patent Office

2,903,433
Patented Sept. 8, 1959

2,903,433

PREPARATION OF SOLID CATALYST COMPOSITES

Reno W. Moehl, Brookfield, Ill., assignor, by mesne assignments, to Universal Oil Products Company, Des Plaines, Ill., a corporation of Delaware No Drawing. Application June 14, 1956
Serial No. 591,280

10 Claims. (Cl. 252—433)

This invention relates to the preparation of solid composites and more particularly to the preparation of solid composites of a complex of a boron halide and metal halide with a support.

Complexes of boron halide and metal halide, preferably in the low valence state, when utilized in conjunction with hydrogen halide, are active catalysts for effecting the conversion of hydrocarbons and other organic compounds. For example, a very effective catalyst comprises a complex of boron trifluoride and ferrous fluoride in conjunction with hydrogen fluoride. This complex is a non-fuming white solid and is stable at ordinary temperatures and pressures. However it loses boron trifluoride when heated, gradually at first, and substantially at 50° C. at atmospheric pressure.

In a preferred method of operation, a solid bed of the complex is dispersed in a reaction zone, and the hydrocarbons or other organic compounds to be converted are passed therethrough in either an upward or downward flow. When the complex is utilized as a fixed bed, it preferably is formed into particles of definite size and shape. However, because the complex loses boron trifluoride, for example, when heated to an elevated temperature, conventional methods of commingling a pilling agent, such as Sterotex (hydrogenated vegetable oil), pilling, and then burning out the pilling agent cannot be employed. Furthermore, with an active catalyst component as formed by the complex of the present invention improved effectiveness is obtained when the active catalyst component is dispersed on a support of carrying material. However, a conventional method of preparing the mixture of complex and support cannot be employed because of the limitation that the complex cannot be heated to a high temperature.

From the description, it will be noted that the preparation of the composite of complex and support presents novel problems which are not encountered in the usual manufacture of supported catalysts. I have found an improved method of preparing such composites.

In one embodiment, the present invention relates to a method of preparing a solid composite of a complex of boron halide and metal halide with a support which comprises compositing with a support a metal halide in which the halogen atom is other than fluorine, thereafter treating with a hydrogen halide in which the halogen atom is characterized by a lower atomic weight than the halogen atom of said last mentioned metal halide to convert said metal halide to a metal halide in which the halogen atom is other than iodine and of lower atomic weight than the original halogen atom of said metal halide, and reacting with boron halide to form said complex with a support.

In another embodiment the present invention relates to a method of preparing a solid composite of boron trifluoride and a metal fluoride with charcoal which comprises compositing a metal chloride with charcoal, thereafter treating with hydrogen fluoride to convert said metal chloride to a metal fluoride, and reacting with boron trifluoride to form said complex with charcoal.

In a still further embodiment, the present invention relates to a method of preparing a solid composite of a complex of boron trifluoride and a metal fluoride with charcoal which comprises soaking particles of charcoal in an aqueous solution of a metal chloride, removing excess solution, thereafter treating with hydrogen fluoride to convert said metal chloride to a metal fluoride, and reacting with boron trifluoride to form said complex with charcoal.

In a specific embodiment, the present invention relates to a method of preparing a solid composite of a complex of boron trifluoride and ferrous fluoride with charcoal which comprises compositing ferrous chloride with charcoal, thereafter treating with hydrogen fluoride to convert said ferrous chloride to ferrous fluoride, and reacting with boron trifluoride to form said complex with charcoal.

In another specific embodiment, the present invention relates to a method of preparing a solid composite of a complex of boron trifluoride and ferrous fluoride with charcoal which comprises soaking particles of charcoal in an aqueous solution of ferrous chloride, removing excess solution, thereafter treating with hydrogen fluoride to convert said ferrous chloride to ferrous fluoride, and reacting with boron trifluoride to form said complex with charcoal.

It will be noted that the first step in the preparation comprises forming a composite of a metal halide and the support, the metal corresponding to the metal halide desired in the complex and the halogen atom being selected from chlorine, bromine, and iodine. Any suitable support may be utilized and preferably is a porous material so that a high surface area is provided. This results in improved utilization of the active catalyst dispersed upon and within the support. A particularly preferred support comprises activated charcoal. Any suitable carbonaceous support may be utilized and may be selected from charcoals or chars prepared from wood, nut shells, bones, etc., coke prepared from petroleum, coal, etc., carbons including carbon black, lamp black, graphite, etc., lignites, coal, bagasse, etc. It is understood that the carbonaceous support may be in the form of particles of different size and shape formed by grinding, chopping, etc., or of particles of uniform size and shape formed by pelleting, extrusion, etc. Other supporting materials include metal fluorides such as aluminum fluoride, calcium fluoride, magnesium fluoride, strontium fluoride, barium fluoride, etc.

It is understood that the support may comprise other metal fluorides which will not be substantially dissolved, removed, or otherwise adversely affected upon contact with hydrogen halide and particularly hydrogen fluoride utilized as a component of the catalyst. Similarly, the other halides, including chlorides, bromides, and/or iodides, of the metal specifically set forth above or of other metals may be utilized provided they meet the requirements hereinbefore set forth.

Furthermore, metal oxides or other metal compounds may be employed provided they retain satisfactory physical properties during use. In some cases the metal oxide or other metal compound may in part react with the hydrogen halide but will retain its physical properties to provide a suitable supporting material. It is understood that the various supports are not necessarily equivalent and that the particular support to be used will be selected with regard to the specific complex and hydrogen halide utilized as the catalyst.

The metal halide in which the metal corresponds to that metal desired in the complex and in which the halogen atoms are of higher atomic weight than the desired halogen atom of the complex may be composited with the support in any suitable manner. As hereinbefore set forth, a complex comprising ferrous fluoride and boron trifluoride is particularly preferred. In this embodiment, a preferred method of compositing the metal halide in which the halogen is other than fluorine with the support is by soaking, suspending, immersing, dipping, etc., the support particles in an aqueous solution of ferrous chloride or ferrous bromide or ferrous iodide for a time sufficient to distribute the ferrous halide throughout the support, after which excess solution is removed and the resultant support is treated to convert the ferrous halide to the desired ferrous fluoride. Instead of soaking the support particles in a solution of ferrous halide as above indicated, the ferrous halide solution may be circulated, pumped, or otherwise passed through a bed of the support particles. When desired, the mixture of solution and particles may be mixed by suitable mechanical means including, for example, mixing paddles, etc., or the use of a rotating mixing zone. As hereinbefore set forth, the time of contact will be sufficient to effect complete dispersion of the ferrous halide upon and within the support and may range, for example, from 10 minutes to 48 hours or more. The contacting preferably is effected at ambient temperatures, although elevated temperatures may be employed, which temperatures usually will be below 100° C. This 100° C. temperature is at atmospheric pressure. If it is desired to utilize higher temperatures, superatmospheric pressures will be employed which permit the use of such higher temperatures along with liquid phase contact.

When ferrous chloride is utilized as the metal halide solution, a particularly preferred method of converting the same to ferrous fluoride is to remove the excess solution, dry the composite, and then the resultant mass reacts readily with hydrogen fluoride and boron trifluoride to form the complex. The drying may be effected at any suitable temperature and for a time sufficient to effect substantial drying, and thus the temperature may range from about 100° to about 400° C. or more for a period of time of from about 0.5 to 48 hours or more. When the metal halide composited with the support is in the low valence state, i.e., ferrous chloride on charcoal, the drying is preferably carried out in the absence of oxygen, for example with hydrogen atmosphere, or an inert gas such as nitrogen, etc.

While ferrous chloride is preferred, it is understood that other suitable salts of iron may be utilized, including ferrous bromide, ferrous iodide, ferric chloride, ferric bromide, ferric iodide, and the hydrated forms thereof. Ferrous chloride is particularly preferred as the metal halide, and ferrous chloride tetrahydrate is still more particularly preferred, because of its ready solubility in aqueous solutions and the preparation of especially active catalysts therefrom. While aqueous solutions are preferred, it is understood, that in some cases, solutions in organic solvents may be employed including, for example, alcohols, ethers, ketones, aldehydes, esters, carbon disulfide, etc.

From the above description, it will be noted that any suitable method of forming a composite of suitable metal halide with the support may be employed in accordance with the present invention. Furthermore, it is understood that these various methods are not necessarily equivalent.

While the heretofore set forth description has been directed primarily to the preparation of a composite of iron halide in which the halogen atom is other than the fluorine and a support, it is understood that the same general method may be employed for the preparation of a composite of a support and other suitable metal halides in which the halogen atom is other than fluorine, including particularly nickelous and cobaltous halides. Halides of other metals which may be employed include halides of platinum, palladium, chromium, molybdenum, tungsten, vanadium, tantalum, titanium, zirconium, manganese, etc.

Soluble halides of these other metals include nickel chloride, nickel chloride hexahydrate, nickel bromide, nickel bromide trihydrate, nickel iodide, cobaltous chloride, cobaltous chloride hexahydrate, cobaltous bromide, cobaltous bromide hexahydrate, cobaltous iodide, cobaltous iodide dihydrate, cobaltous iodide hexahydrate, cobaltic chloride, platinous chloride, platinic chloride, platinic chloride octahydrate, platinous bromide, platinic bromide, platinous iodide, platinic iodide, palladium chloride, palladium chloride dihydrate, palladium bromide, palladium iodide, chromous chloride, chromous iodide, chromic chloride, chromic chloride hexahydrate, chromic bromide, chromic bromide hexahydrate, molybdenum dichloride, molybdenum trichloride, molybdenum tetrachloride, molybdenum pentachloride, molybdenum dibromide, molybdenum tribromide, molybdenum tetrabromide, tungsten dichloride, tungsten tetrachloride, tungsten pentachloride, tungsten hexachloride, tungsten dibromide, tungsten pentabromide, tungsten diiodide, vanadium dichloride, vanadium trichloride, vanadium tetrachloride, vanadium tribromide, tantalum chloride, tantalum bromide, titanium dichloride, titanium trichloride, titanium tetrachloride, titanium tetrabromide, titanium tetraiodide, zirconium chloride, zirconium bromide, zirconium iodide, manganese dichloride, manganese dichloride tetrahydrate, manganese perchloride, manganese dibromide, manganese dibromide tetrahydrate, manganese diiodide, manganese diiodide tetrahydrate, etc. It is understood that other suitable compounds of these metals may be employed. Of the above compounds those of the lowest valence state of each metal are preferred and of these lowest valence state compounds, those of the iron group, namely ferrous, nickelous, and cobaltous compounds are particularly preferred.

In accordance with the process of the present invention, a metal halide containing a halogen atom other than that desired in the final composite and of higher molecular weight is composited with the desired support and the thus formed composite is treated with a hydrogen halide in which the halogen atom is of lower atomic weight than the halogen atom of the metal halide thus composited with the support. An example of this type of preparation has been set forth hereinabove wherein ferrous chloride is composited with charcoal and the resultant composite treated with hydrogen fluoride to convert the ferrous chloride to ferrous fluoride which is then treated with boron trifluoride to form the desired complex with charcoal. A few other examples should provide sufficient illustration. Ferrous iodide is composited with a suitable support and the resultant composite is then treated with hydrogen bromide, hydrogen chloride, or hydrogen fluoride to convert the ferrous iodide to ferrous bromide, ferrous chloride, and ferrous fluoride respectively. The resultant composites are then treated with a boron halide in which the halogen atom is the same as or different from the halogen atom of the resultant composite to form the desired complex with the support. While boron trifluoride is the preferred boron halide utilized in the preparation of the above mentioned complexes, the other boron halides including boron trichloride and boron tribromide and excluding boron triiodide may be utilized but not necessarily with equivalent results. Another illustration is the compositing of ferric chloride with a suitable support and the treating of said resultant composite with hydrogen fluoride to convert the ferric chloride to ferric fluoride which is then reacted with boron trifluoride to form the desired complex with the support. In a like manner nickelous or cobaltous chloride are converted to the respective fluorides with hydrogen fluoride and then reacted with boron trifluoride to form complexes. In each case the metal halide starting material is converted to a metal halide in which the halogen atom is of lower atomic weight than the starting material by reaction with a hydrogen halide, which hydrogen halide is composed of the desired halogen constituent. Thus metal iodides are converted to metal bromides, metal chlorides and metal fluorides, while metal bromides are converted to metal chlorides and metal fluorides, and metal chlorides are converted to metal fluorides.

The resultant metal halides formed by the conversion are then reacted with the desired boron halide to form the desired complex on the support. The complexes formed in accordance with the present invention are of particular utility for use in catalysts compositions. As hereinbefore set forth, these preformed complexes, when utilized in conjunction with a hydrogen halide, are very active catalysts for effecting conversion of hydrocarbons and other organic compounds. Thus, with hydrogen fluoride, the complex of boron trifluoride and ferrous fluoride is a very active catalyst for the alkylation of isoparaffins with olefins and particularly isobutane, isopentane, isohexane, etc., or mixtures thereof, with ethylene, propylene, 1-butene, 2-butene, isobutylene, amylenes, etc., or mixtures thereof. This complex, along with hydrogen fluoride, is also a very active catalyst for the isomerization of paraffins including n-butane, n-pentane, n-hexane, etc., or mixtures thereof. Furthermore, the complex along with the hydrogen halide may be utilized for catalyzing other condensation or rearrangement reaction as well as destructive reactions in which a molecule is decomposed into a similar size molecule or into two or more molecules as, for example, the hydrocracking of oil heavier than gasoline into lower boiling products and particularly gasoline, etc. These and other reactions are generally effected at a temperature within the range of about −50° C. to 300° C. or more and preferably 10° to 150° C., utilizing a pressure within the range of from atmospheric to 5,000 lbs./sq. in. or more.

For many reactions, it is necessary to employ both the complex and hydrogen halide as the catalyst. In these reactions, the complex alone does not function as a catalyst. However, in some other reactions, the complex alone functions to catalyze the reactions and in such cases the complex may be used alone or, as desired, along with hydrogen halide.

The hydrocarbon conversion processes may be effected in any suitable manner and preferably comprise disposing a fixed bed of complex in a reaction zone and passing the charge, at the desired temperature and pressure and space velocity, through the complex in either upward or downward flow. Hydrogen halide may be commingled with the charge and thus introduced into the reaction zone or it may be introduced into it in any other suitable manner. Following the reaction, the products are fractionated or otherwise separated into the desired product and unconverted fractions along with excess hydrogen halide, when employed, and the unconverted fractions and hydrogen halide may be recycled to the reaction zone for further use therein. When hydrogen is utilized, the excess hydrogen is likewise separated from the converted products and preferably is recycled to the reaction zone. Instead of a fixed bed operation described above, a fluidized type of operation, suspensoid or slurry type operation, or moving catalyst bed type of operation may be employed.

The following examples are introduced to illustrate further and novelty and utility of the present invention but with no intention of unduly limiting the same.

EXAMPLE I

A complex of boron trifluoride and ferrous fluoride composited with charcoal was prepared in the following manner: 300 cc. (132 g.) of 8–14 mesh coconut charcoal was soaked in a solution comprising 160 g. of ferrous chloride tetrahydrate dissolved in 125 ml. of water at ambient temperature for a period of about one hour. To prevent oxidation of the ferrous chloride during this period of time while in contact with air, 3 ml. of hydrochloric acid (concentrated) and 0.5 g. of powdered iron were added to the aqueous ferrous chloride solution. The charcoal utilized was 97.4% volatile at 900° C. and gave 2.6% ash at the same temperature. A spectrographic analysis of the coconut charcoal showed that it contained 0.35% iron, 0.005% manganese, 0.002% copper, 0.005% titanium, 0.05% aluminum, 0.03% magnesium, 0.2% calcium, and 0.05% sodium. After the one hour soaking period, the excess solution was removed by draining. The composite was then dried in a stream of heated nitrogen.

A portion of the above prepared composite after drying was treated with HF at 550–600° F. to replace the chlorine with fluorine. The fluorine content of this sample after this HF treatment was 10.8%, corresponding to a ferrous fluoride content of 26.7 wt. percent. This ferrous fluoride-charcoal composite is then placed in a 450 ml. capacity stainless steel autoclave which is then pressured to about 500 p.s.i. with boron trifluoride. The autoclave is allowed to stand for 24 hours after which time the pressure is released and the resultant complex with charcoal removed therefrom.

Another portion of the ferrous chloride impregnated charcoal was placed in a section of stainless steel tube, hydrogen fluoride was added thereto, and heat applied until a temperature of 500–600° F. was attained. This hydrogen fluoride treatment was continued for 2 hours during which time the pressure was released periodically to vent hydrogen chloride as formed. After 2 hours time the hydrogen fluoride source was disconnected and the entire system was flushed with nitrogen and then the hydrogen fluoride treatment was repeated for an additional 2 hour period of time. After this period of time, the system was cooled and boron trifluoride was admitted to the stainless steel tube and the pressure raised to 300 p.s.i. Repeated additions of boron trifluoride were required to keep the pressure up to 300 p.s.i. The boron trifluoride treatment was continued for 20 hours after which time boron trifluoride pressure was released and the system again flushed with nitrogen. The composite of complex and charcoal was then removed from the stainless steel tube.

Another sample of the ferrous chloride impregnated charcoal was treated with hydrogen fluoride at 750–800° F. to replace the chlorine of the ferrous chloride and to form ferrous fluoride. After cooling to room temperature, boron trifluoride was added until a pressure of 300 p.s.i. was obtained and this pressure was maintained for 20 hours. After this period of time had elapsed, the pressure was released and the complex of ferrous chloride with boron trifluoride on charcoal was isolated. A sample of this material was tested for catalytic activity for the alkylation of isobutane with mixed olefins, said olefins comprising propylene, 1-butene, 2-butene, and isobutylene.

This testing was carried out in a continuous bench scale alkylation pilot plant into the reactor of which the complex was placed as a fixed bed. The operating conditions utilized are shown in detail in the following Table I. In addition to the charge of isobutane and mixed olefins, approximately 40 ml./hr. was passed through a liquid hydrogen fluoride saturation zone and from there combined with the charge prior to passage over the catalyst. The yields of product are given in Table I as well as Engler distillations of the products. In this case the combined products from runs 4 and 5 were evaluated for F–1 clear octane number. The F–1 clear octane number of this combined product was 80.3.

Table I

| Period | 1 | 2 | 3 | 4 | 5 | 6 |
|---|---|---|---|---|---|---|
| Duration of Periods, hrs | 6 | 6 | 6 | 6 | 6 | 6 |
| Cumulative Catalyst Time, hrs | 6 | 12 | 18 | 24 | 30 | 36 |
| Operating Conditions: | | | | | | |
| i-$C_4$ to Olefin Ratio | 10.4 | 10.4 | 10.4 | 10.4 | 10.4 | 10.4 |
| i-$C_4$ to Olefin Blend Feed, ml./hr | 213 | 215 | 208 | 206 | 203 | 203 |
| i-$C_4$ thru HF Saturator, ml./hr | 41 | 40 | 40 | 30 | 46 | 39 |
| Cat. T., °C.— | | | | | | |
| Top | 23 | 27 | 28 | 26 | 26 | 26 |
| Bottom | 27 | 29 | 30 | 27 | 27 | 25 |
| LHSV | 4.2 | 4.2 | 4.1 | 3.9 | 4.1 | 4.0 |
| P.s.i.g | 200 | 200 | 200 | 200 | 200 | 200 |
| Promoter | HF | HF | HF | HF | HF | HF |
| Stabilized Product: | | | | | | |
| Recovered, gm | 88.3 | 90.1 | 90.5 | 94.8 | 95.8 | 100.5 |
| Wt. percent based on Olefin | 162.6 | 164.4 | 170.1 | 180.2 | 185.3 | 193.6 |
| Bromine No | 0.9 | 0.3 | 0.1 | 0.1 | 0.4 | 0.3 |
| Spec. Grav. @ 60° F | 0.7012 | | 0.7033 | 0.7022 | | 0.6988 |
| Engler Dist., °F.— | | | | | | |
| IBP | 97 | | 98 | 90 | | 83 |
| 10 | 218 | | 220 | 212 | | 213 |
| 20 | 224 | | 224 | 220 | | 220 |
| 30 | 230 | | 232 | 226 | | 225 |
| 40 | 237 | | 240 | 233 | | 231 |
| 50 | 245 | | 251 | 241 | | 238 |
| 60 | 260 | | 273 | 258 | | 252 |
| 70 | 296 | | 322 | 296 | | 296 |
| 80 | 356 | | 380 | 365 | | 362 |
| 90 | | | | | | |
| EP | 426 | | 460 | 446 | | 442 |
| Percent Recovered | 89.5 | | 89.5 | 90.0 | | 89.0 |
| Percent Bottoms | 1.2 | | 1.2 | 1.2 | | 1.2 |
| Percent Loss | 9.3 | | 9.3 | 8.8 | | 9.8 |
| O.N. F-1 Clear (Depentanized) | | | | 80.3 | | |

EXAMPLE II

A complex comprising boron trifluoride and nickelous fluoride may be prepared in substantially the same manner as described in Example I. An aqueous solution of nickelous chloride is prepared, and finely divided activated charcoal is soaked therein. After draining excess solution, and drying, hydrogen fluoride is passed over the resultant composite for 2 hours at 100° C. Following this, boron trifluoride is added and the mixture contacted for 24 hours to form the complex of nickelous fluoride and boron trifluoride with charcoal.

EXAMPLE III

This example illustrates the preparation of coboltous fluoride-boron trifluoride complex with charcoal. Finely divided charcoal is soaked in an aqueous solution of cobaltous bromide hexahydrate, excess solution then is drained off, and the resultant solid is dried at 150° C. thereby forming a composite of cobaltous bromide and charcoal. Hydrogen fluoride and boron trifluoride then are commingled with the composite of cobaltous bromide and charcoal, and the resultant mixture heated and contacted at 100° C. for 30 hours.

EXAMPLE IV

The complex of this example comprises chromous bromide and boron tribromide composited with activated charcoal. The activated charcoal particles are soaked in a carbon disulfide solution of chromous iodide, excess solution drained, and the composite dried. The composite is contacted with hydrogen bromide and then is treated with boron tribromide, preferably along with hydrogen bromide, to form the complex of chromous bromide and boron tribromide composited with a charcoal support.

EXAMPLE V

The complex of this example comprises manganese chloride and boron trichloride composited with aluminum oxide. The aluminum oxide is prepared as finely divided porous material. The aluminum oxide particles are soaked in an aqueous solution of manganese bromide tetrahydrate for 16 hours after which excess solution is drained and the mixture heated at 250° C. for 8 hours to form a composite of manganese bromide intimately dispersed throughout the aluminum oxide support. The composite of manganese bromide and aluminum oxide is then treated with hydrogen chloride for 2 hours at 100° C. following which the resultant composite is reacted with boron trichloride to form a complex of manganese chloride and boron trichloride.

I claim as my invention:

1. A method of preparing a solid composite of a complex of boron halide and metal halide with a support which comprises compositing with an inert support a metal halide in which the halogen atom is other than fluorine and in which the metal is selected from the group consisting of iron, nickel, cobalt, platinum, palladium, chromium, molybdenum, tungsten, vanadium, tantalum, titanium, zirconium and manganese, thereafter treating with hydrogen halide in which the halogen atom is characterized by a lower atomic weight than the halogen atom of said last mentioned metal halide at a temperature sufficient to convert said metal halide to a metal halide in which the halogen atom is other than iodine and of lower atomic weight than the original halogen atom of said metal halide, and reacting with boron halide at a temperature sufficient to form said complex with a support.

2. A method of preparing a solid composite of a complex of boron trifluoride and metal fluoride with a support which comprises compositing an iron group metal halide, in which the halogen atom is other than fluorine, with an inert support, thereafter treating with hydrogen fluoride at a temperature sufficient to convert said metal halide to a metal fluoride, and reacting with boron trifluoride at a temperature sufficient to form said complex with a support.

3. A method of preparing a solid composite of a complex of boron trifluoride and a metal fluoride with a support which comprises compositing an iron group metal chloride with an inert support, thereafter treating with hydrogen fluoride at a temperature sufficient to convert said metal chloride to a metal fluoride, and reacting with boron trifluoride at a temperature sufficient to form said complex with a support.

4. A method of preparing a solid composite of a complex of boron trifluoride and a metal fluoride with charcoal which comprises compositing an iron group metal chloride with charcoal, thereafter treating with hydrogen fluoride at a temperature sufficient to convert said metal chloride to a metal fluoride, and reacting with boron trifluoride at a temperature sufficient to form said complex with charcoal.

5. A method of preparing a solid composite of a complex of boron trifluoride and ferrous fluoride with charcoal which comprises compositing ferrous chloride with charcoal, thereafter treating with hydrogen fluoride at a temperature sufficient to convert said ferrous chloride to ferrous fluoride, and reacting with boron trifluoride at a temperature sufficient to form said complex with charcoal.

6. A method of preparing a solid composite of a complex of boron halide and metal halide with a support which comprises soaking particles of an inert support in an aqueous solution of a metal halide in which the halogen atom is other than fluorine and in which the metal is selected from the group consisting of iron, nickel, cobalt, platinum, palladium, chromium, molybdenum, tungsten, vanadium, tantalum, titanium, zirconium and manganese, removing excess solution, thereafter treating said particles with a hydrogen halide in which the halogen atom is characterized by a lower atomic weight than the halogen of said last mentioned metal halide at a temperature sufficient to convert said metal halide to a metal halide in which the halogen atom is other than iodine and of lower atomic weight than the original halogen atom of said metal halide, and reacting with boron halide at a temperature sufficient to form said complex with a support.

7. A method of preparing a solid composite of a complex of boron trifluoride and metal fluoride with a support which comprises soaking particles of an inert support in an aqueous solution of an iron group metal halide in which the halogen atom is other than fluorine, removing excess solution, thereafter treating said particles with hydrogen fluoride at a temperature sufficient to convert said metal halide to a metal fluoride, and reacting with boron trifluoride at a temperature sufficient to form said complex with a support.

8. A method of preparing a solid composite of a complex of boron trifluoride and a metal fluoride with a support which comprises soaking particles of an inert support in an aqueous solution of an iron group metal chloride, removing excess solution, thereafter treating with hydrogen fluoride at a temperature sufficient to convert said metal chloride to a metal fluoride, and reacting with boron trifluoride at a temperature sufficient to form said complex with support.

9. A method of preparing a solid composite of a complex of boron trifluoride and a metal fluoride with charcoal which comprises soaking particles of charcoal in an aqueous solution of an iron group metal chloride, removing excess solution, thereafter treating with hydrogen fluoride at a temperature sufficient to convert said metal chloride to a metal fluoride, and reacting with boron trifluoride at a temperature sufficient to form said complex with charcoal.

10. A method of preparing a solid composite of a complex of boron trifluoride and ferrous fluoride with charcoal which comprises soaking particles of charcoal in an aqueous solution of ferrous chloride, removing excess solution, thereafter treating with hydrogen fluoride at a temperature sufficient to convert said ferrous chloride to ferrous fluoride, and reacting with boron trifluoride at a temperature sufficient to form said complex with charcoal.

References Cited in the file of this patent

UNITED STATES PATENTS

| | | |
|---|---|---|
| 2,142,980 | Huijser et al. | Jan. 3, 1939 |
| 2,416,106 | Linn et al. | Feb. 18, 1947 |
| 2,624,713 | Hurley | Jan. 6, 1953 |
| 2,673,139 | Woolf et al. | Mar. 23, 1954 |
| 2,716,142 | Skiles et al. | Aug. 23, 1955 |